March 9, 1954      R. S. KINKEAD      2,671,300

MOWER HAVING INTEGRAL FRAME

Filed Dec. 18, 1950

INVENTOR.
ROBERT S. KINKEAD

BY *Caswell & Lagaard*

ATTORNEYS

UNITED STATES PATENT OFFICE 2,671,300

MOWER HAVING INTEGRAL FRAME

Robert S. Kinkead, St. Paul, Minn.

Application December 18, 1950, Serial No. 201,452

9 Claims. (Cl. 56—249)

The herein disclosed invention relates to reel type mowers and has for an object to provide a frame construction for a mower which will at all times maintain proper relation between the bed knife and reel of the mower.

Another object of the invention resides in providing a mower in which the reel may be removed from the mower without taking apart the frame of the mower.

A still further object of the invention resides in constructing the frame with spaced side frame members, a bed knife supporting bar and an upper transverse bar all integrally connected together as by welding to form a one piece rigid frame.

Another object of the invention resides in constructing the side frame members with horizontal and inclined legs arranged in angular relation with the bights therebetween extending upwardly and exposed and with the shaft for the reel disposed in the bights.

Another object of the invention resides in supporting the ends of the reel on arms pivoted to the side frame members and connected to studs fast on said frame members and adjustably supporting the reel for movement relative to the bed knife.

Another object of the invention resides in constructing the bed knife supporting bar, preferably tubular in form and of triangular cross section with a base extending in the direction of the ground, with an upright portion projecting upwardly therefrom and with a sloping portion extending downwardly to the base and having a flange overlying the same.

Another object of the invention resides in disposing the bed knife on the underside of the base and attaching the same to the supporting bar by rivets or bolts extending jointly through the base and through the flange of the bar.

Other objects of the invention reside in the novel combination and arrangement of parts and in the details of construction hereinafter illustrated and/or described.

Figure 1:
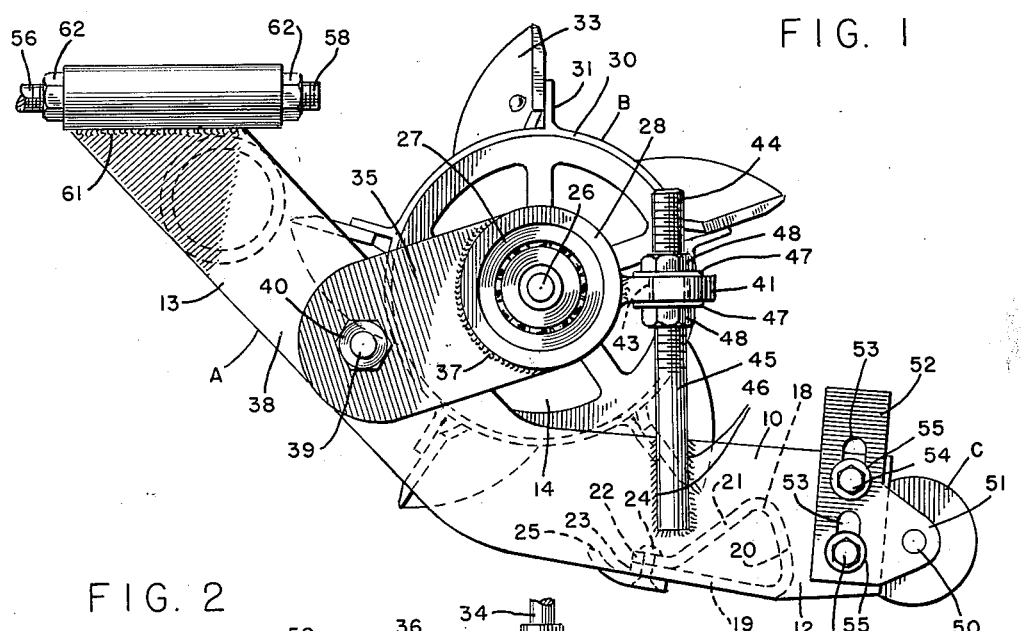
Fig. 1 is a side elevational view of a mower illustrating an embodiment of the invention.
Figure 2:
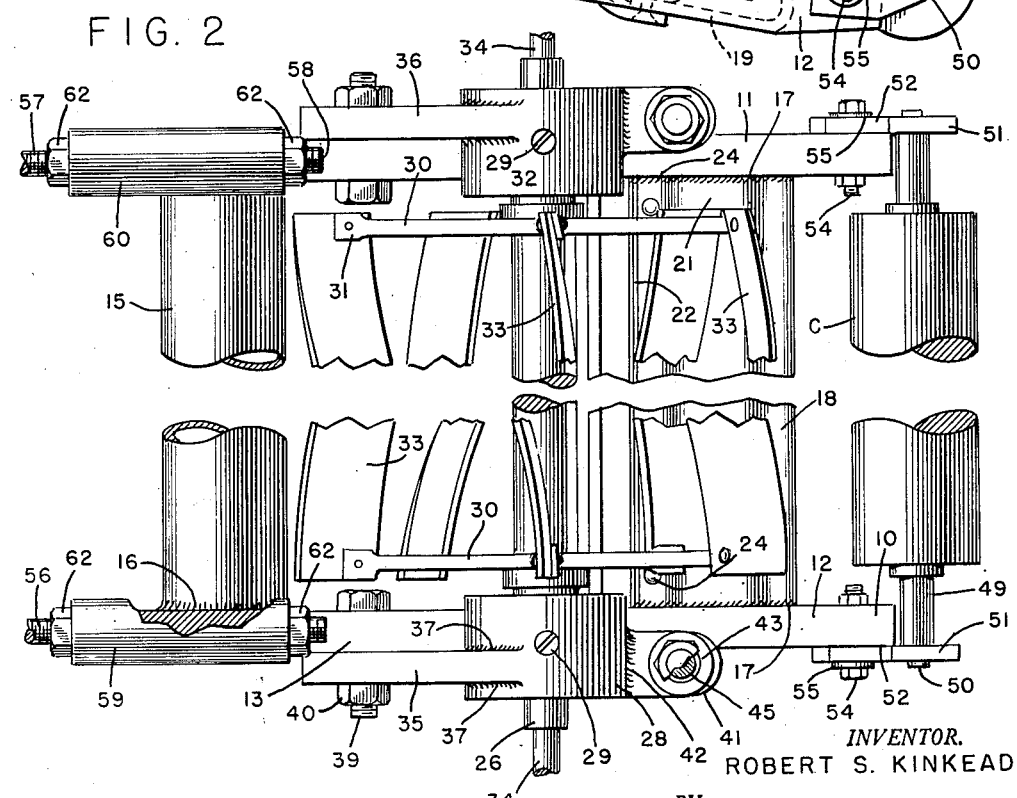
Fig. 2 is a plan view of the structure shown in Fig. 1.

The structure illustrated in the drawing consists of a frame comprising plate like side frame members, angular in form having lower horizontally extending legs and upwardly inclined legs. To the forward portions of the horizontal legs is welded a bed knife supporting bar which is tubular in form. This supporting bar is triangular in cross section having a base with an upright portion extending upwardly therefrom. Said supporting bar further includes a sloping portion terminating in a flange overlying the free edge of the base. Rivets extending through said flange and base and through the bed knife maintain the bed knife securely attached to the supporting bar. The upper ends of the inclined legs of the side frame members have welded to them a transverse bar which is also tubular in form and which may be circular in cross section. Pivoted to the side frame members near the lower ends of the inclined legs thereof are two arms which at their free ends carry bearings rotatably supporting the reel shaft of the mower. Studs secured to the horizontal portions of said side frame members extend through lugs on said bearings and nuts screwed on said studs adjust the reel with respect to the bed knife. A roller adjustably supported at the ends of the horizontal portions of the side frame members supports the rear end of the mower on the ground while attaching means secured to the upper ends of the inclined legs of the side frame members support the forward end of the frame.

The particular embodiment of the invention shown comprises a frame A in which is rotatably mounted a reel B. This frame is supported at its rearward end by means of a roller C and through other means at its forward end adapted to be connected to a tractor.

The frame A consists of two side frame members 10 and 11 which are identical in construction. For this reason only the side frame member 10 will be described in detail. The side frame member 10 is constructed from plate material which may be cut or bent into the desired form. This side frame member has a substantially horizontally disposed leg 12 and an upwardly inclined leg 13. These legs form a bight 14 therebetween which is disposed upwardly of the frame and which is open.

The upper ends of the legs 13 of the frame members 10 and 11 have welded to them by means of welds 16 a horizontally extending transverse bar 15. This bar 15 is tubular in form and may be of circular cross section.

At the rearward ends of the legs 12 of the side frame members 10 and 11 is welded to the same by means of welds 17 a bed knife supporting bar 18. This supporting bar is tubular in form and is triangular in cross section. The said bar includes a base 19, an upright portion 20 and a downwardly sloping portion 21. At the lowermost end of the sloping portion 21 is formed a flange 22 which overlies the free end 23 of the base 19. Rivets 24 extend through the flange 22, the free end 23 of base 19 and through a bed knife 25 underlying the base 19 and hold the knife rigidly secured to the bar and the parts of the bar in rigid position.

The reel 13 consists of a shaft 26 which is rotatably mounted in roller or ball bearings 27. These bearings are mounted in tubular housings 28 and are secured therein by means of set-screws 29. The shaft 26 carries a number of spiders 30 which are mounted on said shaft and secured thereto in the customary manner. These spiders have circumferentially spaced lugs 31 extending outwardly therefrom and to which are riveted by means of rivets 32 a number of spirally extending blades 33. These blades are disposed so as to engage the bed knife 25 and to shear the grass coming in between the same. The shaft 26 has extensions 24 at the ends of the same which may be connected to a suitable source of power derived from the tractor and by means of which the reel is driven.

The reel B is supported by two arms 35 and 36 which are similar in construction. For this reason only the arm 35 will be described in detail. This arm is constructed from plate material in the form shown and is welded to the housing 28 by means of welds 37. This arm overlies the outer surface 38 of the leg 13 of the side frame member 10 which is ground or otherwise constructed flat and square with the bed knife 25. A bolt 39 passes through the leg 13 and through the arm 35 and pivots the same for swinging movement in a direction to move the blades 33 of reel B toward and from the bed knife 25. Upon tightening the nut 40 of bolt 39 the arm 35 may be rigidly clamped to the side frame member 10. The housing 28 has a lug 41 secured thereto by welds 42. This lug has a hole 43 drilled in the same and which freely receives the threaded end 44 of a stud 45. The stud 45 is secured to the leg 12 of side frame member 10 by means of welds 46. The hole 43 is large enough in diameter to permit the arm 35 to swing upwardly and downwardly and to give the reel B the required adjustment. Washers 47 overlie the lug 41 and nuts 48 engaging said washers and screwed on the threaded end 44 of the stud 45 serve to adjust and hold the reel in proper relation with respect to the bed knife 25.

The rearward end of the frame A is supported by the roller C. This roller has a shaft 49 which is formed at its ends with journals 50. These journals are rotatably mounted in bearings 51 which are carried by brackets 52. The brackets 52 have slots 53 in the same and through which extend bolts 54. These bolts also extend through the rearward ends of the horizontal legs 12 of the frame members 10 and 11. Washers 55 are mounted on said bolts adjacent the heads thereof and overlie the bracket 52 in the locality of the slots 53. By means of this construction the ends of the roller C may be independently raised and lowered and supported in adjusted position.

The forward end of frame A may be supported from the tractor by which the mower is drawn. For this purpose two rods 56 and 57 are employed. The ends 58 of these rods are threaded as shown and extend through two sleeves 59 and 60 secured to the upper ends of the inclined legs 13 of the frame members 10 and 11 by means of welds 61. Nuts 62 screwed on said threaded ends 58 of said rods clamp the rods in position. The rods 56 and 57 are suitably connected to the tractor to permit of drawing the mower over the ground. If desired, the forward end of the mower may be supported by gauge wheels in the customary manner.

In operation the mower is drawn by the tractor and the reel thereof driven by a suitable power transmission connected to one of the shaft extensions 34 of shaft 26. The said reel may instead be driven through a coupling from the shaft extension of another driven mower reel if available. The reel when driven cooperates with the bed knife 25 to cut the grass in the customary manner. When it becomes necessary to adjust the position of the reel with reference to the bed knife adjustment can be procured by loosening the nuts 40 on bolts 39 and adjusting the nuts 48 on studs 45. When it becomes desirable to completely remove the reel from the frame, bolts 39 are removed and the uppermost of the nuts 38 similarly removed. The shaft 26, the bearings 27 and the housings 28 being all disposed in the bight 14 of frame members 10 and 11 are readily removed outwardly through said bight without taking the frame apart.

The advantages of the invention are manifest. By means of the angular shaped side frame members having the exposed bights, the reel may be removed without taking apart the frame. This permits welding the frame members together to form an integral one-piece construction having extreme rigidity. By means of the triangular shaped bed knife supporting bar extreme rigidity is procured for the bed knife so that the proper relationship between the sickle and bed knife is at all times procured.

What is deemed to be novel and desired to be protected by Letters Patent is:

1. In a mower a frame having side frame members each consisting of a horizontal leg and an inclined leg forming therebetween an upwardly facing open bight, continuous one piece transverse frame members extending across said side frame members at the ends of said legs and integral therewith, a bed knife carried by the transverse frame member at the end of the horizontal legs, arms pivoted to said side frame members, bearings carried by said arms and a reel having a shaft journalled in said bearings and disposed in said bights and blades movable toward and from said bed knife upon swinging of said arms, said reel being disengageable from said frame by movement outwardly through said bights.

2. In a mower a frame having side frame members each consisting of a horizontal leg and an inclined leg forming therebetween an upwardly facing open bight, continuous one piece transverse frame members extending across said side frame members at the ends of said legs and integral therewith, a bed knife carried by the transverse frame member at the end of the horizontal legs, arms pivoted to said side frame members, bearings carried by said arms, a reel having a shaft journalled in said bearings and disposed in said bights and blades movable toward and from said bed knife upon swinging of said arms, said reel being disengageable from said frame by movement outwardly through said bights, lugs movable with said arms and having holes therein, threaded studs integral with said side frame members and passing through the holes in said lugs and nuts screwed on said studs and disposed one on each side of said lugs and serving to swing said arms and adjust the reel relative to said bed knife, 3. In a mower a frame having side frame members, each consisting of a horizontal leg and an inclined leg forming therebetween an upwardly facing open bight, continuous one piece transverse tubular frame members extending between said side frame members at the ends of said legs and integral therewith, a bed knife carried by the transverse frame member at the ends of the horizontal legs, a reel having a shaft disposed in said bights and removable from said frame through said bights, said reel further having blades for cooperation with said bed knife, and guide means for guiding said reel for movement toward and from said bed knife.

4. In a mower a frame having side frame members, each consisting of a horizontal leg and an inclined leg forming therebetween an upwardly facing open bight, continuous one piece transverse frame members extending between said side frame members at the ends of said legs and integral therewith, a bed knife carried by the transverse frame member at the end of the horizontal leg, a reel having a shaft disposed in said bights and removable from said frame through said bights, said reel further having blades for cooperation with said bed knife, and guide means for guiding said reel for movement toward and from said bed knife.

5. In a mower a frame having side frame members each consisting of a horizontal leg and an inclined leg forming therebetween an upwardly facing open bight, continuous one piece transverse frame members extending across said side frame members at the ends of said legs and integral therewith, a bed knife carried by the transverse frame member at the end of the horizontal leg, arms pivoted to said side frame members, bearings carried by said arms, a reel having a shaft journalled in said bearings and disposed in said bights and blades movable toward and from said bed knife upon swinging of said arms, said reel being disengageable from said frame by movement outwardly through said bights and means for holding said arms in adjusted position with reference to said side frame members.

6. In a mower a frame having side frame members each consisting of a rearwardly extending substantially horizontal leg and a forwardly extending inclined leg forming therebetween an upwardly facing open bight, a continuous one piece transverse frame member extending across the forward ends of said inclined legs and integral therewith, a bed knife carried by said horizontal legs at the rearward ends of the same and having a cutting edge facing said bights, arms pivoted to said side frame members, bearings carried by said arms, a reel having a shaft journalled in said bearings and disposed in said bights with the axis thereof substantially above the vertexes of said bights, said reel being movable toward and from said bed knife upon swinging of said arms and adjusting means engaging said horizontal legs near the ends thereof and said arms at the outer ends thereof and outwardly of said bearings.

7. In a mower a frame having side frame members each consisting of a substantially horizontal leg and an inclined leg extending upwardly therefrom and forming therewith an upwardly facing open bight, a continuous one piece transverse frame member extending across the outer and upper ends of said inclined legs and integral therewith, a bed knife carried by said horizontal legs and having a cutting edge facing said bights, arms pivoted to said side frame members, bearings carried by said arms, a reel having a shaft journalled in said bearings and disposed in said bights with the axis thereof substantially above the vertexes of said bights, said reel being movable toward and from said bed knife upon swinging of said arms and adjusting means engaging said horizontal legs near the ends thereof and said arms at the outer ends thereof and outwardly of said bearings.

8. In a mower a frame having side frame members, each consisting of a horizontal leg and an inclined leg forming therebetween an upwardly facing open bight, a continuous transverse frame member comprising a single length of tubing, circular in cross section extending between said inclined legs and integral therewith, a second continuous tubular transverse frame member substantially triangular in cross section extending between the horizontal legs and integral therewith, said second named transverse frame member having its lower surface substantially horizontal, a bed knife underlying said surface and secured to said transverse frame member, a reel having a shaft disposed in said bights and removable from said frame through said bights, said reel further having blades for cooperation with said bed knife, and guide means for guiding said reel for movement toward and from said bed knife.

9. In a mower a frame having side frame members each consisting of a horizontal leg and an inclined leg forming therebetween an upwardly facing open bight, continuous one-piece transverse frame members extending across said side frame members at the ends of said legs and integral therewith, a bed knife carried by the transverse frame member at the end of the horizontal leg, arms pivoted to said side frame members, and extending in the direction of and above said horizontal legs, said arms terminating short of the ends of said horizontal legs, adjusting means acting between the outer ends of said arms and said horizontal legs, bearings carried by said arms and disposed between said adjusting means and the pivots for said arms at a locality directly above said bights and a reel having a shaft journaled in said bearings and engageable with said bed knife.

ROBERT S. KINKEAD.

References Cited in the file of this patent

UNITED STATES PATENTS

| Number | Name | Date |
|---|---|---|
| Re. 22,031 | Clemson | Feb. 24, 1942 |
| 1,969,211 | Dohm | Aug. 7, 1934 |
| 2,401,611 | Carlson | June 4, 1946 |
| 2,543,364 | Goldberg et al. | Feb. 27, 1951 |